United States Patent [19]

Slavin et al.

[11] Patent Number: 5,355,140
[45] Date of Patent: Oct. 11, 1994

[54] EMERGENCY REPORTING FOR MARINE AND AIRBORNE VESSELS

[75] Inventors: Michael W. Slavin, Palo Alto; James M. Janky, Los Altos, both of Calif.; Jeffrey S. Rubin, Fairfield, Conn.

[73] Assignee: Trimble Navigation Limited, Sunnyvale, Calif.

[21] Appl. No.: 945,265

[22] Filed: Sep. 15, 1992

[51] Int. Cl.$^5$ .............................. G01S 1/08; G01S 5/02
[52] U.S. Cl. ........................................ 342/386; 342/357
[58] Field of Search ........................ 342/357, 386, 389

[56] References Cited

U.S. PATENT DOCUMENTS

| | | | |
|---|---|---|---|
| 4,547,778 | 10/1985 | Hinkle et al. | 342/456 |
| 4,731,613 | 3/1988 | Endo et al. | 342/357 |
| 4,744,083 | 5/1988 | O'Neill et al. | 371/22 |
| 4,833,477 | 5/1989 | Tendler | 342/389 |
| 4,910,525 | 3/1990 | Stulken | 342/418 |
| 5,193,215 | 3/1993 | Olmer | 342/389 |

*Primary Examiner*—Gregory C. Issing
*Attorney, Agent, or Firm*—John Schipper

[57] ABSTRACT

Method and apparatus for reporting of an emergency event experienced by a marine vessel, an airborne vessel or by an occupant of the vessel. The present vessel position, accurate to within a few tens of meters, and (optionally) the vessel velocity and local air quality, is determined at an ordered sequence of times, using a position-determining Global Positioning System, such as the Navstar system or the GLONASS system. If an emergency occurs on the vessel, the approximate present position and time of occurrence of this event is broadcast on one or more of the mobile communication or emergency radiowave bands. Optionally, the type of emergency event that has occurred, drawn from a predetermined list of such types, is also broadcast by a vessel in distress, for receipt by an emergency response facility or by another vessel that can respond to a call for assistance. Optionally, vessel velocity heading and/or vessel position quality of fix information is also broadcast by a vessel in distress.

35 Claims, 4 Drawing Sheets

EMERGENCY REPORTING FOR MARINE AND AIRBORNE VESSELS

BACKGROUND OF THE INVENTION

1. Technical Field

This invention relates to reporting of emergency events and the locations of such events for marine or airborne vessels and their occupants by electronic reporting means, using global positioning information received from satellites.

2. Background Art of the Invention

A marine or airborne vessel (referred to simply as a "vessel" herein) and its occupants can experience an emergency event, such as vessel disablement, vessel sinking or capsizing, vessel crash, fire on board, position loss, radio failure or person overboard, on any navigable waterway or air flight path. If an emergency event occurs out of sight of a Coast Guard station or other emergency response facility, it is important to report the event, including its location, time of occurrence and type of event, to an emergency response facility or another marine or airborne vessel so that assistance can be received, if needed. Many of the reporting procedures available today for emergency events rely upon visually perceptible signals, such as semaphore signals, light signals and the like, and do not report much more than the fact that an emergency event has occurred.

U.S. Pat. No. 3,866,206, issued to DeGiorgio et al, discloses an emergency signalling system having a manually operated generator to provide supplemental power. The system communicates with a home station, which identifies the communicator and automatically transmits a signal-received return message upon receipt. This system requires maintenance of a home station and does not provide determination of position, type of emergency or time of occurrence, Use of global positioning techniques or any equivalent system for position identification is not mentioned.

Muncheryan, in U.S. Pat. No. 3,911,425, discloses an alarm system, for signalling for emergency help, using both visual means (a sign or flashing light) and audible means such as a microwave transmitter. The alarm may be turned on at a predetermined time, presumably with reference to the time the emergency event has occurred. This system is apparently intended for communication at short distances, such as sight distance of a few hundred feet and does not broadcast position, type of emergency or time of occurrence, Use of global positioning techniques or any equivalent system for position identification is not mentioned.

McDonald discloses a marine signalling system for indicating the position of a boat or person in the water in U.S. Pat. No. 3,952,694. The system uses a buoyant means attached to the boat or person and adapted to be reeled out as a distress signal that can be more easily seen by a search aircraft or search boat. The signalling means is purely visual (a marker with one or two colors that contrast with the surrounding sea) and uses no electronic communications.

U.S. Pat. No. 4,468,656, issued to Clifford et al, discloses a signalling device for rescuing workers endangered by occurrence of an emergency event. The device is worn by each worker, transmits on a different frequency for each worker, and provides an audio signal as well. An emergency signal may be transmitted by voluntary action by the worker, by sensing the worker's physical condition, or by sensing the condition of an environmental protection system (such as a self-contained breathing apparatus) carded by the worker. The system does not provide determination of position or time of occurrence of the emergency event. The system may provide information on the type of emergency, through its sensing of the physical condition of the worker or of the environmental condition of the worker's equipment.

Gantz, in U.S. Pat. No. 4,466,698, discloses an emergency signalling device that displays a visually perceptible, coded signal, such as SOS, when activated in response to occurrence of an emergency event. The signalling means is purely visual, and communication would be limited to a few hundred feet. No electronic communications is used.

A system for signalling occurrence of an emergency event within a vehicle is disclosed in U.S. Pat. No. 4,550,304, issued to Saitta. The signalling means is purely visual (a flashing or rotating light mounted outside the vehicle), and the signal is activated voluntarily by an occupant of the vehicle. The emergency events contemplated for use of this device include robbery of a taxicab driver, sudden heart attack, and the like). The signalling means is arranged so that the light is not reflected back into the vehicle from any nearby object. No electronic communications is used.

Ray et al disclose a system, attached to a telephone in a home or business, that detects tone dialing of a 911 number in U.S. Pat. No. 4,878,236. The system responds to this detection by activating a strobe light or other visual means, positioned outside the structure where the emergency event occurs, that helps an emergency response team to easily locate the structure from which the emergency call originated. The signalling means is purely visual, although the device is activated by initial use of the telephone.

Turner, in U.S. Pat. No. 4,903,243, discloses a marine transponder system that is selectively activated to produce a predetermined light, audio or radio transmission signal pattern for navigation or for use with EPIRBs. An EPIRB is an emergency signalling device, mounted on a marine vessel or a nearby buoy or other fixed or floating object, that is activated in response to occurrence of an emergency event nearby. The emergency event might be sinking of a vessel, person overboard, heart attack on board, or similar occurrence. The EPIRB system then emits a predetermined signal indicating the EPIRB position and occurrence of an unspecified emergency. This system does not transmit position of the vessel or person in trouble, the nature of the emergency event or the time the event occurred. The Turner system uses intermittent signalling to reduce power consumption, and the signal emitted may be visual, audio or radio wave. The receiver or "home station" receives the transmission, in coded form if desired, and determines the position of the EPIRB transmitter, based on the frequency used or the decoded message and a list of such positions incorporated at the receiver. The receiver then transmits certain information for receipt and response by the Coast Guard or other emergency response unit. If an EPIRB transmitter position is changed, the new location would have to be manually re-entered at the receiver. No provision is made for accurately tracking the continuously changing position of the vessel or person.

U.S. Pat. No. 3,860,900, issued to Scudder, discloses a method of determination of the position of a towed underwater object, using three or more fixed, underwater transponders that communicate acoustically and electronically with a interrogation module carried on the towed object and on the marine towing vessel. A different frequency is used for communications between the vessel and each of the underwater transponders. An on-board computer carried by the vessel uses the interrogation response delay times to compute the position of the towed object by triangulation. Because of attenuation of underwater signals by the ambient medium, the transponders must be near the towed object and the vessel. The method does not appear to extend directly to reporting of an event, such as a particular type of emergency, that occurs on the towed object.

What is needed is an approach that provides emergency event reporting for a marine or airborne vessel and/or its occupants, including vessel position, vessel velocity heading, type of event and time of occurrence, for any navigable waterway or air flight path anywhere in the world. Preferably, the approach would also provide continuing information on the vessel's position after the event occurs, in the event that the vessel moves away from the location where the event occurred.

SUMMARY OF THE INVENTION

These needs are met by the invention, which uses the Global Positioning System (GPS), such as the Navstar system, the GLONASS System or a similar global positioning approach, to first determine the position of a vessel at the time the vessel or one or more of its occupants experiences an emergency event. Signals received from three or more satellites in a GPS or similar global positioning system are used to determine the position of the vessel, accurate to within a few tens of meters or better, either continuously or at the time the emergency event occurs. If an emergency event occurs, the time of occurrence is also noted automatically. The type of event may be determined automatically or by a person on board. The time of occurrence and vessel position and, optionally, type of event, vessel velocity heading, and quality of vessel position fix at that time are broadcast on a marine or aircraft emergency frequency to all nearby emergency response facilities, by voice or by digitally encoded message. Optionally, the vessel may continue to broadcast its present position and/or heading (including velocity, elevation and position fix quality, if the vessel is airborne) so that, if the vessel drifts or is carded by the local water or air currents or other forces, a responder to the emergency will not have to guess as to the present position of the vessel, using the velocity and heading of the last-received message to calculate the present vessel position. The chances of a successful emergency response are thus substantially improved, even if interruptions occur in the emergency signal transmissions. The cost of responding to an emergency signal is also substantially reduced.

This approach provides any emergency response facility with all the information a responder to the emergency would need for a first-response effort. Present position is automatically made available, for emergency reporting or other purposes, and can be changed automatically as time changes or the vessel changes its position. By reporting the type of emergency event that has occurred, any equipment required to respond to that event can be brought to the vessel by a responder to the emergency event.

The position fix quality is optionally transmitted to allow the responder to the emergency signal to estimate how reliable is the position fix. This information may be crucial in organization of the response to an emergency or distress signal.

These and other advantages of the present invention will become apparent to those skilled in the art upon a reading of the following specification of the invention and a study of the several figures of the drawing.

DETAILED DESCRIPTION OF THE PREFERRED EMBODIMENTS

Figure 1:
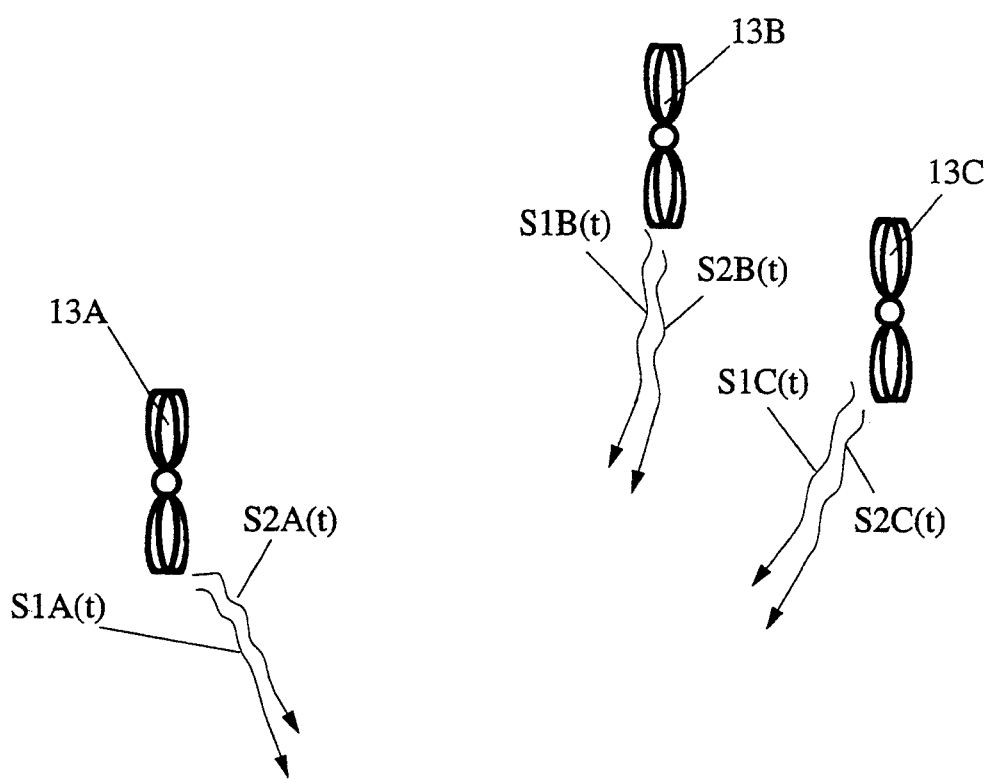
FIG. 1 is a representation of occurrence of an emergency event for a marine vessel or an occupant on board the vessel.
Figure 1:
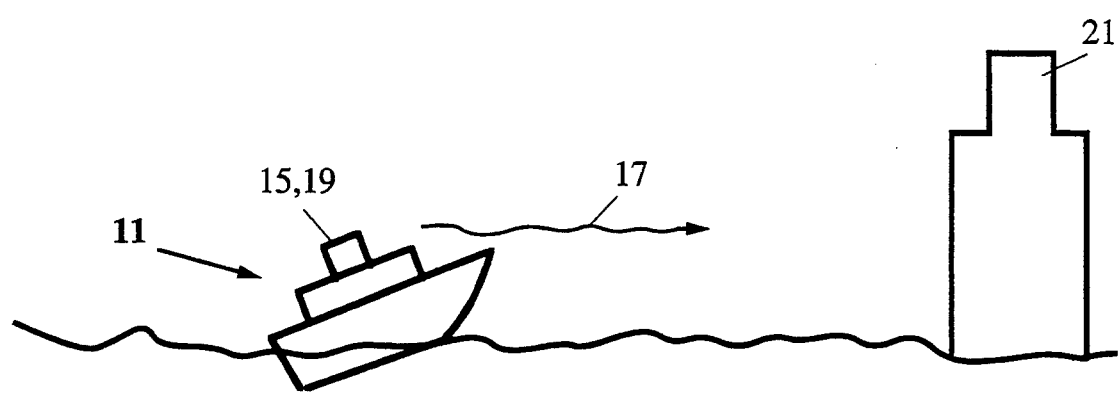

FIG. 1 illustrates a marine vessel at approximately the time an emergency event occurs, and reporting of that event according to the invention. For some period preceding the emergency event, a vessel 11 receives sequences of signals S1m(t) and S2m(t) (m=A, B, C) at one or more frequencies f1, f2, etc. from three or more satellites 13A, 13B and 13C, part of a GPS, that indicate the present position, accurate to within a few tens of meters, of the vessel. The vessel 11 carries a position-indicating module 15 that receives and interprets these signals and determines the present position in a continuing manner. The present position of the vessel 11 is broadcast as a distress signal 17 in a continuing manner, along with identification of the vessel, by a transmitter 19 that receives vessel position and, optionally, vessel velocity and position fix quality information from the position-indicating module 15. Alternatively, the transmitter 19 could be arranged so that it broadcasts only if an emergency event occurs, in one of the mobile communications or emergency bands, such as 2.182 MHz, 121.5 MHz, 243 MHz, 406 MHz or other suitable radio communication bands. These bands are collectively referred to herein as Emergency Radiowave Bands. Time is often of the essence in communicating with an Emergency Response Facility (ERF) or anyone else who can respond to an emergency event. Thus, it may be preferable to arrange to transmit the emergency event information, simultaneously or sequentially, in one, two or more of the bands that are part of the Emergency Radiowave Bands.

Figure 2:
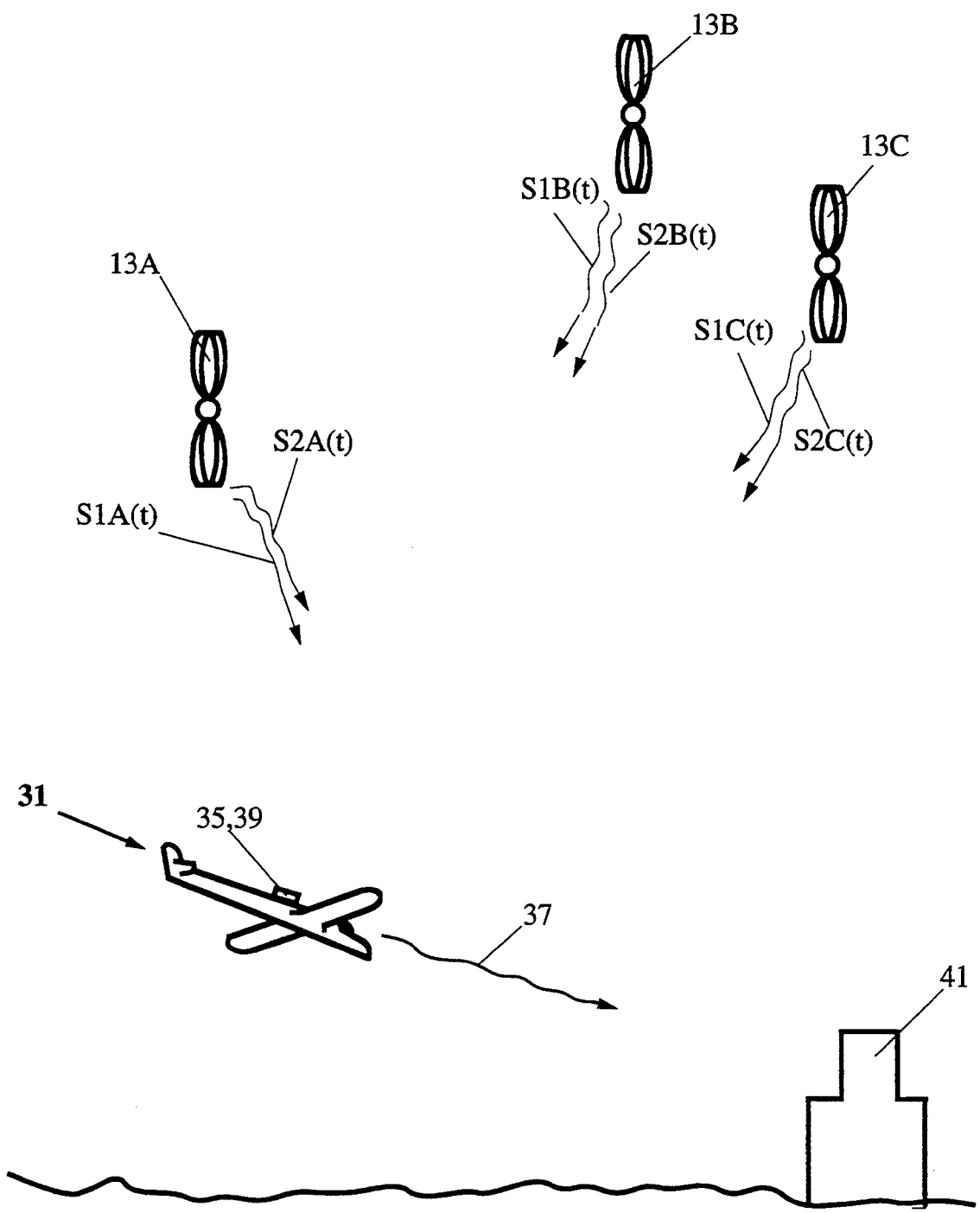
FIG. 2 is a representation of occurrence of an emergency event for an airborne vessel or an occupant on board the vessel.

FIG. 2 illustrates an airborne vessel, such as an aircraft or dirigible, at approximately the time an emergency event occurs. As in FIG. 1, before the emergency event occurs the vessel 31 has received sequences of signals S1m(t) and S2m(t) (m=A, B, C) at one or more frequencies f1, f2, etc. from a satellite-based global positioning and navigation system, such as GPS, from which the present position of the vessel 31 can be determined. The vessel 31 carries a position-indicating module 35 that receives and interprets the signals S1m(t) and S2m(t) as in FIG. 1. The present position and ,optionally, the present velocity, velocity heading and present position fix quality, are broadcast as a distress signal 37 in a continuing manner, along with identification of the vessel 31, by a transmitter 39 that receives the position information and, optionally, the vessel velocity and position fix quality information from the position-indicating module 35. The module 35 may determine the present velocity and velocity heading by Doppler measurement of the satellite signals received. The vessel 31 optionally carries a vessel position fix quality monitoring module 40 that determines the quality of the position fix, either continuously or at the time an emergency event occurs. The distress signal 37 is received by an ERF 41 on one or more of the Emergency Radiowave Bands.

If an emergency occurs, either an operator on board manually enters the type of emergency event, or the on-board transmitter senses and automatically determines the type of this event. The transmitter then broadcasts the present position information, the time this event occurred, velocity heading information (optional) and position fix quality information (optional) for the vessel. Optionally, the type of emergency event and other information concerning the emergency event and/or the vessel and its occupants can also be broadcast. The non-optional information items recited above would be sufficient, for many purposes, for a first response to the call for assistance by a marine vessel. For an airborne vessel, the velocity heading and position fix quality should preferably be included in the information broadcast. The message broadcast by the on-board transmitter is received by one or more vessels or more emergency response facilities, and one of these vessels or facilities can respond to the call for assistance.

The emergency event may be any of several types, and the responder may need to determine the type in order to adequately respond to the emergency assistance call from the vessel. The types of emergency events include: vessel disablement; radio disablement; vessel sinking or capsizing; vessel falling from the sky; fire or explosion on board; navigational position loss; heart attack, serious injury or other health-threatening event; or person overboard. With certain of these events, such as a heart attack or person overboard, the responder may need to bring certain equipment in order to properly respond to the particular emergency event. This information is optionally provided by the message broadcast by the on-board transmitter in the initial message.

The present position of the vessel is determined by a global navigation and/or positioning system, such as a Global Positioning System, is provided, such as the United States Navstar system, or the GLONASS System. The Navstar GPS uses two frequencies f1=1.227 MHz and f2=1.575 MHz broadcast by each of 24 satellites, arranged in four non-geosynchronous orbits of six satellites each that encircle the globe. The GPS is described in detail in U.S. Pat. Nos. 4,754,465, issued to Trimble, 4,847,862 and 4,970,523, issued to Braisted and Eschenbach, all of which are incorporated herein by reference. The GLONASS System also uses two frequencies and operates in a manner similar to the Navstar system and is summarized in "Comparing GPS and GLONASS ", GPS World, November/December 1990, pp. 52–54, and "GLONASS and GPS", GPS World, April 1991, pp. 36–39.

Figure 3:
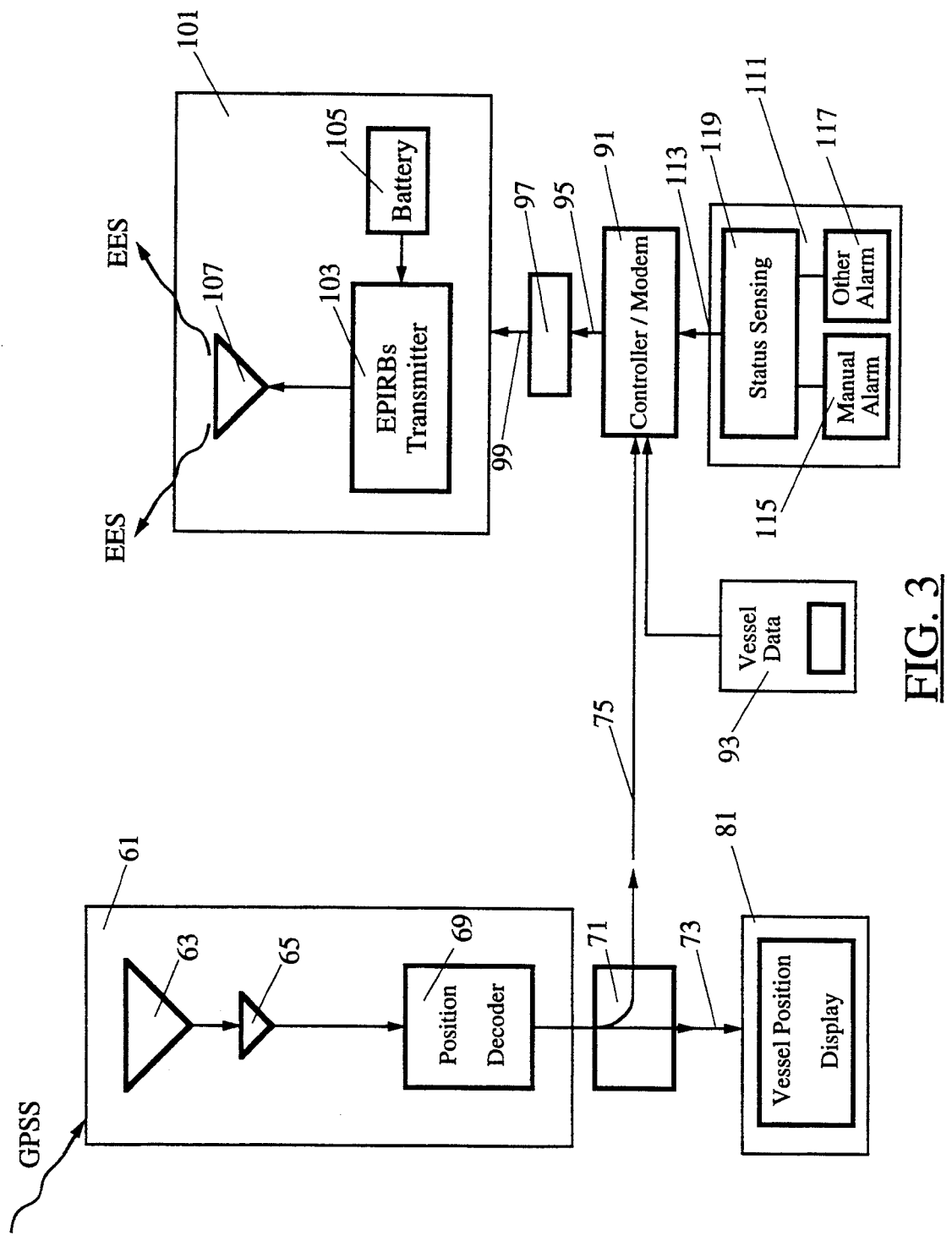
FIG. 3 is a schematic view of on-board emergency reporting apparatus carded on the vessel according to one embodiment of the invention.

FIG. 3 illustrates a suitable on-board apparatus for emergency event reporting from the vessel according to the invention. The apparatus includes a global position receiver module 61 that includes an antenna 63 (or two or more such antennae for receiving global position system signals GPSS at more than one frequency), a signal amplifier 65 to receive the signal from each antenna 63. The amplified global position system signals GPSS issued by the signal amplifier 65 are received by a position decoder module 67 that decodes the GPSS to provide a decoded position signal on a first signal line 69. This decoded position signal is received by a signal splitter 71 that issues this signal on a second signal line 73 (optional) and on a third signal line 75. The decoded position signal is received on the second signal line 73 by a position display module 81 (optional) that displays the present position of the vessel in an alphanumeric display of latitude and longitude, or graphically, or both. The GPS receiver may be integrated with the decoder module 67 and/or display module 81 and may share common operating facilities.

The decoded position signal is received on the third signal line 75 by a controller/modem module 91 that optionally also receives input information from a vessel data module 93. The input information received by the controller/modem module 91 from the vessel data module 93 may include information on the type of emergency event that occurs and on the present condition of the vessel, vessel velocity heading and quality of vessel position fix. Normally, this information would be entered, using the vessel data module 93, only in response to occurrence of an emergency event on or adjacent to the vessel.

In response to receipt of an emergency event signal by the controller/modem module 91 from the vessel data module 93, the module 91 first issues a wake-up command on a signal line 95 that is received by a data interface module 97 for transmission apparatus 101. The transmission apparatus 101 includes an EPIRBs transmitter 103, driven by a battery or other power source 105, and a transmitter antenna 107. The wake-up command issued on the signal line 95 is passed through the data interface module 97 and received by the transmitter 103 and by the battery 105 (optional) and brings these components to a state of readiness. The controller/modem module 91 then sends information concerning present vessel position, type of emergency event that has just occurred, and the time of occurrence on the signal line 95, and this information is broadcast as an Emergency Event Signal, EES, by the transmitter module 103 using the antenna 107. Continuous transmission by the transmitter module 103 of vessel position information is often not appropriate, because this will quickly drain the battery 105 of power. Preferably, transmission by the transmitter/antenna combination 103/107 of information on the vessel position by an EES takes place only after an emergency event, if any, occurs, and such transmission occurs either continuously or intermittently, depending upon the requirements of the responder and the power still available at the EPIRBs transmitter. As noted above, transmission of an EES may be made in one or more of the Emergency Radiowave Bands, simultaneously or sequentially, in order to notify a potentially larger group of radio listeners that an emergency event has occurred on or adjacent to the vessel in distress.

After an emergency event occurs, the controller/modem module 91 may cause the transmitter module 103 to continue intermittently to broadcast the (fixed) position of the vessel at the time the emergency event occurred as part of the EES. Alternatively, the controller/modem module 91 may cause the transmitter module 103 to broadcast the present (possibly changing) position, velocity and position fix quality of the vessel, as received on the signal lines 69 and 75 from the position decoder module 67, as part of the EES. This latter approach would be preferable if the vessel is likely to drift or move after occurrence of the emergency event so that the present position of the vessel is likely to change from the vessel position at the time of the emergency event.

The controller/modem module 91 optionally also receives one or more input signals from emergency event sensing apparatus 111 on a fourth signal line 113. The event sensing apparatus 111 is driven by a manually operated alarm module 115 and, optionally, by one or more automatic alarm modules 117 that automatically sense the occurrence of certain kinds of emergency events on or adjacent to the vessel. An alarm signal is received from the manual alarm module 115 and/or from an automatic alarm module 117 by a status sensing module 119 that determines that an emergency event has occurred and notifies the controller/modem module 91 of this occurrence on the signal line 113.

Figure 4:
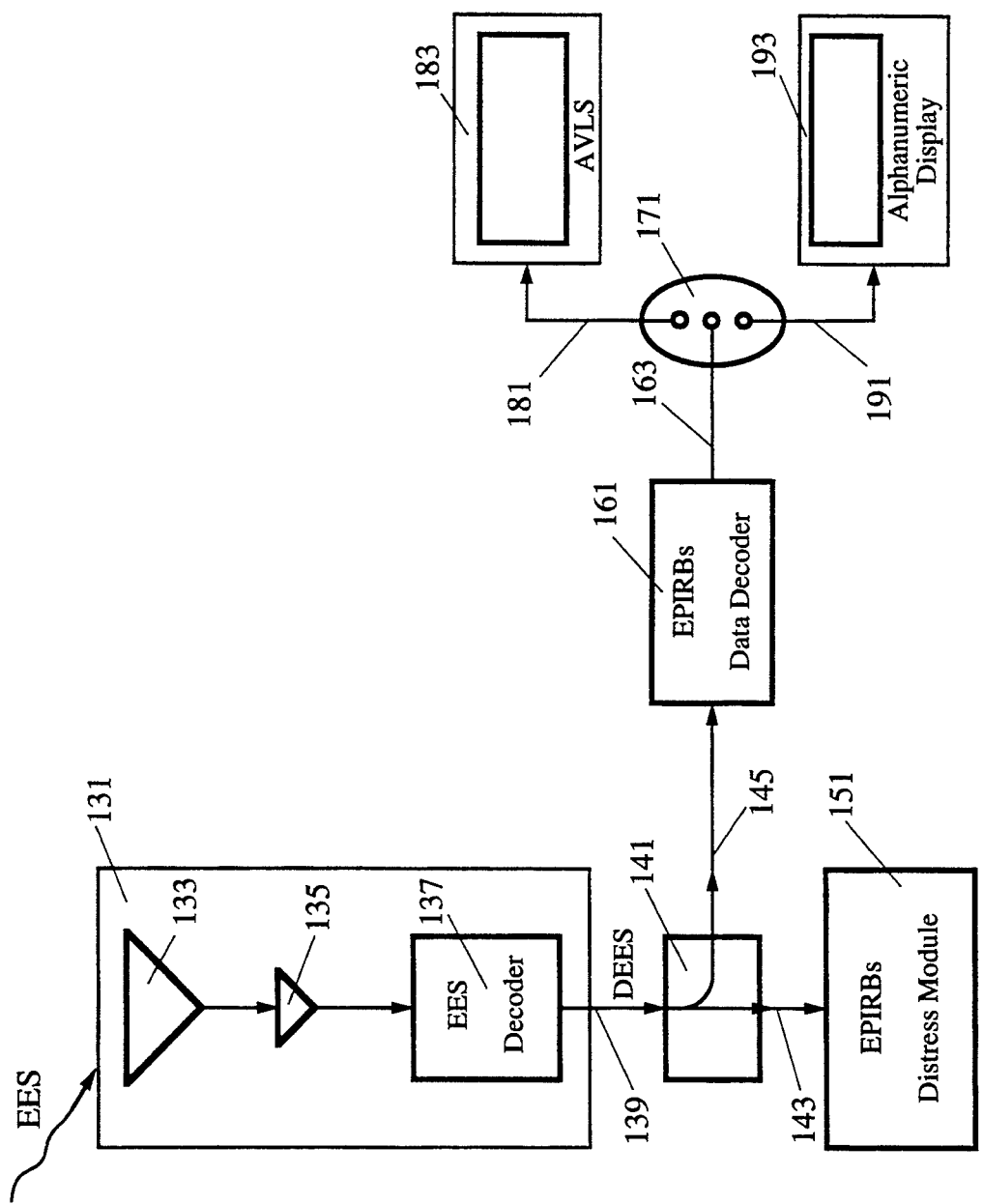
FIG. 4 is a schematic view of distress signal analysis apparatus that may be used at an emergency response facility according to one embodiment of the invention.

FIG. 4 illustrates suitable apparatus located at a Coast Guard or other emergency response facility that can be used to receive and respond to an emergency event information signal or distress signal transmitted by a vessel in distress. The EES is received by an EPIRBs receiver apparatus 131 that includes an antenna 133, a signal amplifier 135 and an EES decoder module 137, arranged serially as shown. A decoded emergency event signal, DEES, is issued by the EES decoder module 137 on a first signal line 139, and the DEES is received by a signal splitter module 141 that issues the DEES on a second signal line 143 and on a third signal line 145. The DEES is received on the second signal line 143 by an EPIRBs distress module 151 that informs personnel at the ERF that a reportable emergency event has occurred. The DEES is received on the third signal line 145 by an EPIRBs data decoder module 161 that further decodes the this signal to determine the position of the vessel that issued the distress signal, the time of occurrence of the emergency event and (optionally) the type of emergency event that has occurred. The EPIRBs data decoder module 161 issues this decoded information on a fourth signal line 163 that is received by a signal switch module 171.

The switch module 171 is connectable through a fifth signal line 181 to a conventional AVLS display module 183 that receives and graphically displays position information on the vessel in distress. Preferably, the AVLS display module 183 automatically calls up an appropriate map of the region that includes the present distress vessel position and graphically displays the position of the vessel in distress by a suitable icon positioned at the broadcast site on this map. Optionally, the AVLS display module 183 can also graphically display the velocity vector or velocity heading of the vessel at the time the distress signal is received.

The switch module 171 is also connectable through a sixth signal line 191 to an alphanumeric display module 193 that displays latitude and longitude information on the vessel in distress, together with information on time of occurrence and type of emergency event, on such display. Optionally, the display module 193 can also display the velocity vector components of the vessel at the time the distress signal is received.

While this invention has been described in terms of a preferred embodiment, it is contemplated that alterations, modifications and permutations thereof will become apparent to those skilled in the art upon a reading of the specification and study of the drawings. It is intended that the following appended claims include all such alterations, modifications and permutations that fall within the spirit and scope of the present invention.

We claim:

1. A method for reporting of an emergency event experienced by a marine or airborne vessel, or one of the occupants of the vessel, the method comprising the steps of:

receiving signals transmitted by three or more satellites in a Global Positioning System by a position-determining module located on the vessel;

determining, from these received signals, the present position of the vessel and the quality of the present position fix that estimates the inaccuracy of the vessel present position fix at each of an ordered sequence of times;

when an emergency event occurs, determining the approximate time of occurrence of such event, the position of the vessel and the quality of the position fix at approximately the time such event occurred; and broadcasting the approximate time and position and present position fix quality of the vessel when the emergency event occurs on a selected frequency in at least one of the Emergency Radiowave Bands.

2. The method of claim 1, further comprising the steps of:

determining the components of velocity heading of said vessel when an emergency event occurs; and broadcasting the vessel velocity heading information on said selected frequency in said Emergency Radiowave Bands.

3. The method of claim 1, further comprising the steps of:

determining the type of said emergency event that has occurred; and broadcasting information identifying this type of said emergency event on said selected frequency in said Emergency Radiowave Bands.

4. The method of claim 3, further comprising the step of determining that an emergency event has occurred whenever vessel disablement, radio disablement, vessel sinking, vessel capsizing; vessel crash; fire on board; explosion on board; navigational position loss; person overboard; heart attack; or serious injury occurs on or adjacent to said vessel.

5. The method of claim 1, further comprising the step of continuing to broadcast the approximate time said emergency event occurred and the present position of said vessel after an initial broadcast is made in response to occurrence of said emergency event.

6. The method of claim 5, further comprising the step of continuing to broadcast the approximate time said emergency event occurred and the present velocity heading of said vessel after an initial broadcast is made in response to occurrence of said emergency event.

7. The method of claim 5, further comprising the step of continuing to broadcast the approximate time said emergency event occurred and the present quality of position fix of said vessel after an initial broadcast is made in response to occurrence of said emergency event.

8. The method of claim 1, further comprising the step of broadcasting said approximate time and position of said vessel on two or more selected frequencies lying in said Emergency Radiowave Bands.

9. Apparatus for reporting of an emergency event experienced by a marine or airborne vessel, or one of the occupants of the vessel, the apparatus comprising:
position determination means, carried on board the vessel, for receiving signals at one or more selected frequencies from three or more satellites that are part of a Global Positioning System, for determining from these signals the present position of the vessel and the quality of the present position fix that estimates the inaccuracy of the vessel present position fix, and for issuing the present position and present position fix quality as output signals; and
transmitter means, carried on board the vessel, for receiving the present position and position fix quality output signals from the position determination means and, when the vessel or one of its occupants experiences an emergency event, for broadcasting a signal including the position of the vessel, the position fix quality and the time of occurrence of this event when this event occurs.

10. The apparatus of claim 9, wherein said position determination means also determines the present velocity heading of said vessel and issues the present vessel velocity heading as an output signal.

11. The apparatus of claim 9, further comprising:
event determination means for determining the type of said emergency event that occurs and for making information on this type of said event available to said transmitter so that said transmitter can also broadcast the type of said event at the time said vessel position and said time of emergency event occurrence are broadcast.

12. The apparatus of claim 11, wherein an emergency event is determined to have occurred whenever vessel disablement, radio disablement, vessel sinking, vessel capsizing, vessel loss of altitude, fire on board, explosion on board, navigational position loss, person overboard, heart attack, or serious injury occurs on or adjacent to said vessel.

13. The apparatus of claim 9, wherein said transmitter broadcasts on one or more selected frequencies in the Emergency Radiowave Bands.

14. The apparatus of claim 9, wherein said transmitter broadcasts on two selected frequencies in the Emergency Radiowave Bands.

15. The apparatus of claim 9, wherein said transmitter continues to broadcast said time of emergency event occurrence and the present position of said vessel after an initial broadcast made in response to occurrence of said emergency event.

16. Apparatus for reporting of an emergency event experienced by a marine or airborne vessel, or one of the occupants of the vessel, the apparatus comprising:
position signal receiver means, positioned on the vessel, for receiving a position-indicating signal from three or more satellites that are part of a Global Positioning System, and for decoding this signal to produce and issue a vessel position signal and a position fix quality signal that indicate the approximate present position of the vessel and an estimate of the inaccuracy of the present position fix of the vessel;
emergency event sensing means for determining whether an emergency event has occurred on or adjacent to the vessel and, when an emergency event occurs, for issuing an event occurrence signal indicating the occurrence and time of occurrence of that emergency event; and
emergency event transmitter means, connected to the position signal receiver means and to the emergency event sensing means, for receiving a vessel position signal and, when an event occurrence signal is received, for intermittently transmitting an emergency event signal including the vessel position, the position fix quality and the time of occurrence of that emergency event on at least one selected frequency lying in an Emergency Radiowave Band.

17. The apparatus of claim 16, further comprising vessel position display means, positioned on said vessel, for receiving said emergency event signal and for displaying said present position of said vessel as longitude and latitude coordinates of said vessel.

18. The apparatus of claim 16, further comprising vessel position display means, positioned on said vessel, for receiving said emergency event signal and for displaying said present position of said vessel as longitude, latitude and height coordinates of said vessel.

19. The apparatus of claim 16, further comprising:
emergency signal receiver means, spaced apart from said vessel, for
receiving said emergency event signal transmitted by said emergency event transmitter means and for determining said vessel position of said vessel that has transmitted said emergency event signal and said time of occurrence of said emergency event signal, and for issuing this information as a vessel distress signal; and
vessel position graphic display means for receiving the vessel distress signal and for graphically displaying a map on a display screen that visually indicates said present position of said vessel that has transmitted said emergency event signal and said time of occurrence of said emergency event.

20. The apparatus of claim 16, wherein said emergency event sensing means also determines the type of said emergency event that occurs and said emergency event transmitter means either continuously or intermittently transmits the type of said emergency event as part of said emergency event signal.

21. The apparatus of claim 20, wherein said emergency event sensing means includes data entry means for manually entering information on said type of said emergency event that occurs into said sensing means.

22. The apparatus of claim 20, wherein said emergency event sensing means includes data entry means for automatically entering information on at least one of said type of said emergency event that occurs into said sensing means.

23. The apparatus of claim 20, further comprising:
emergency signal receiver means, spaced apart from said vessel, for receiving said emergency event signal transmitted by said emergency event transmitter means, for determining said vessel position of said vessel that has transmitted said emergency event signal, said time of occurrence of said emergency event signal and said type of said emergency event that has occurred, and for issuing this information as a vessel distress signal; and
vessel position graphic display means for receiving the vessel distress signal and for graphically displaying a map on a display screen that visually indicates said present position of said vessel that has transmitted said emergency event signal, said time of occurrence of said emergency event and said type of emergency event that has occurred.

24. The apparatus of claim 20, further comprising:
emergency signal receiver means, spaced apart from said vessel, for receiving said emergency event signal transmitted by said emergency event transmitter means, for determining said vessel position of said vessel that has transmitted said emergency event signal, said time of occurrence of said emergency event signal and said type of said emergency event that has occurred, and for issuing this information as a vessel distress signal; and
vessel position alphanumeric display means for receiving the vessel distress signal and for displaying the longitude and latitude coordinates for said present position of said vessel that has transmitted said emergency event signal, said time of occurrence of said emergency event and said type of said emergency event.

25. The apparatus of claim 16, further comprising:
emergency signal receiver means, spaced apart from said vessel, for receiving said emergency event signal transmitted by said emergency event transmitter means, for determining said vessel position of said vessel that has transmitted said emergency event signal and said time of occurrence of said emergency event signal, and for issuing this information as a vessel distress signal; and
vessel position alphanumeric display means for receiving the vessel distress signal and for displaying the longitude and latitude coordinates for said present position of said vessel that has transmitted said emergency event signal and said time of occurrence of said emergency event.

26. The apparatus of claim 16, wherein said emergency event signal includes a velocity heading output signal that indicates the approximate velocity components of said vessel at the time said emergency event occurs.

27. The apparatus of claim 16, wherein said emergency event signal includes a velocity heading output signal that indicates the quality of this velocity heading output signal at the time said emergency event occurs.

28. The apparatus of claim 26, further comprising vessel position display means, positioned on said vessel, for receiving said emergency event signal, for displaying said present position of said vessel as longitude, latitude and height coordinates of said vessel and for displaying said velocity components of said vessel.

29. The apparatus of claim 26, further comprising:
emergency signal receiver means, spaced apart from said vessel, for receiving said emergency event signal transmitted by said emergency event transmitter means, for determining said vessel position of said vessel that has transmitted said emergency event signal and said time of occurrence of said emergency event signal, and for issuing this information as a vessel distress signal; and
vessel position graphic display means for receiving the vessel distress signal and for graphically displaying a map on a display screen that visually indicates said present position and said velocity components of said vessel that has transmitted said emergency event signal and said time of occurrence of said emergency event.

30. The apparatus of claim 26, further comprising:
emergency signal receiver means, spaced apart from said vessel, for receiving said emergency event signal transmitted by said emergency event transmitter means, for determining said vessel position of said vessel that has transmitted said emergency event signal and said time of occurrence of said emergency event signal, and for issuing this information as a vessel distress signal; and
vessel position alphanumeric display means for receiving the vessel distress signal and for displaying the longitude, latitude and height coordinates for said present position of said vessel that has transmitted said emergency event signal and time of occurrence of said emergency event.

31. The apparatus of claim 30, wherein said vessel position alphanumeric display means further displays said velocity components of said vessel that has transmitted said emergency event signal.

32. The apparatus of claim 16, wherein said type of said emergency event is selected from a class of events consisting of vessel disablement, radio disablement, vessel sinking, vessel capsizing, vessel loss of altitude, fire on board, explosion on board, navigational position loss, person overboard, heart attack, or serious injury occurs on or adjacent to said vessel.

33. The apparatus of claim 16, wherein said emergency event transmitter means continues to broadcast said approximate time said emergency event occurred and said present position of said vessel after an initial broadcast is made in response to occurrence of said emergency event.

34. The apparatus of claim 16, wherein said emergency event signal is intermittently broadcast on two or more selected frequencies lying in said Emergency Radiowave Bands.

35. The method of claim 1, further comprising the step of determining the date of occurrence of said emergency event and broadcasting this date when said approximate time of said emergency event is broadcast.

* * * * *